(12) United States Patent
Tanaka et al.

(10) Patent No.: US 12,320,952 B2
(45) Date of Patent: Jun. 3, 2025

(54) ANTIREFLECTION COATING MATERIAL, OPTICAL MEMBER WITH ANTIREFLECTION COATING, OPTICAL DEVICE, AND IMAGE CAPTURING APPARATUS

(71) Applicant: CANON KABUSHIKI KAISHA, Tokyo (JP)

(72) Inventors: Hiroyuki Tanaka, Kanagawa (JP); Masaaki Nakabayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1072 days.

(21) Appl. No.: 17/132,949

(22) Filed: Dec. 23, 2020

(65) Prior Publication Data

US 2021/0116606 A1 Apr. 22, 2021

Related U.S. Application Data

(63) Continuation of application No. PCT/JP2019/023727, filed on Jun. 14, 2019.

(30) Foreign Application Priority Data

Jun. 28, 2018 (JP) .................. 2018-123697
May 30, 2019 (JP) .................. 2019-101749

(51) Int. Cl.
  *G02B 1/111* (2015.01)
  *C08K 7/02* (2006.01)
  (Continued)

(52) U.S. Cl.
  CPC ............... *G02B 1/111* (2013.01); *C08K 7/02* (2013.01); *C09D 5/006* (2013.01); *C09D 7/65* (2018.01); *C09D 7/70* (2018.01); *C08L 67/00* (2013.01)

(58) Field of Classification Search
  CPC .... G02B 1/111; G02B 5/0242; G02B 5/0294; G02B 27/0018; C08K 7/02; C08K 9/02;
  (Continued)

(56) References Cited

U.S. PATENT DOCUMENTS

2013/0141792 A1* 6/2013 Ueda .................... G02B 5/0268
  359/601
2013/0300980 A1* 11/2013 Nishimura ............... G02B 5/02
  359/493.01

(Continued)

FOREIGN PATENT DOCUMENTS

JP 2003-128997 A 5/2003
JP 2005-025133 A 1/2005
  (Continued)

*Primary Examiner* — Darryl J Collins
*Assistant Examiner* — Matthew Y Lee
(74) *Attorney, Agent, or Firm* — Canon U.S.A., Inc. IP Division

(57) ABSTRACT

An optical member 10 includes an antireflection coating 12 on a substrate 11. The antireflection coating 12 includes a resin layer 4 and a modified cross-section fiber 1 bound to the resin layer 4. The modified cross-section fiber includes a core and a plurality of protrusions 3 extending from the core. The protrusions 3 of the modified cross-section fiber 1 have extremities protruding from a surface of the resin layer 4.

20 Claims, 4 Drawing Sheets

(51) Int. Cl.
  *C09D 5/00* (2006.01)
  *C09D 7/40* (2018.01)
  *C09D 7/65* (2018.01)
  *C08L 67/00* (2006.01)

(58) Field of Classification Search
  CPC . C08K 9/01; C08K 9/12; C09D 5/006; C09D 7/65; C09D 7/70; C09D 133/08; C09D 133/14; C09D 167/00; C08L 67/00; B32B 2255/00; B32B 2255/26; B32B 2262/12; B32B 2262/16
  See application file for complete search history.

(56) References Cited

U.S. PATENT DOCUMENTS

| | | | | |
|---|---|---|---|---|
| 2015/0226931 A1* | 8/2015 | Huang | | G02B 7/021 359/716 |
| 2016/0334697 A1 | 11/2016 | Kim | | |
| 2017/0219740 A1* | 8/2017 | Kameno | | C01B 33/126 |
| 2019/0094420 A1* | 3/2019 | Choi | | H05K 5/0017 |
| 2020/0298273 A1* | 9/2020 | Adachi | | C09D 183/04 |
| 2021/0011198 A1* | 1/2021 | Suginome | | G02B 7/025 |

FOREIGN PATENT DOCUMENTS

| | | |
|---|---|---|
| JP | 2006-039503 A | 2/2006 |
| JP | 2007-62592 A | 3/2007 |
| JP | 2007-133173 A | 5/2007 |
| JP | 2007-298604 A | 11/2007 |
| JP | 2009-217156 A | 9/2009 |
| JP | 2010-260371 A | 11/2010 |
| JP | 2011-064737 A | 3/2011 |
| JP | 2012-002895 A | 1/2012 |
| JP | 2018-036310 A | 3/2018 |
| JP | 2018031945 A | 3/2018 |
| JP | 2018-178271 A | 11/2018 |
| WO | 2013/002386 A1 | 1/2013 |
| WO | 2014/119693 A | 8/2014 |

\* cited by examiner

000# ANTIREFLECTION COATING MATERIAL, OPTICAL MEMBER WITH ANTIREFLECTION COATING, OPTICAL DEVICE, AND IMAGE CAPTURING APPARATUS

CROSS-REFERENCE TO RELATED APPLICATIONS

This application is a Continuation of International Patent Application No. PCT/JP2019/023727, filed Jun. 14, 2019, which claims the benefit of Japanese Patent Application No. 2018-123697, filed Jun. 28, 2018 and No. 2019-101749, filed May 30, 2019, which are hereby incorporated by reference herein in their entirety.

BACKGROUND OF THE INVENTION

Field of the Invention

The present invention relates to an antireflection coating material, an optical member with an antireflection coating made of the coating material, an optical device, and an image capturing apparatus.

Description of the Related Art

An optical device, such as a lens barrel, includes a housing and an optical system including a plurality of lenses arranged in the housing. Rays of light entering the optical device impinge mainly on the lenses. The rays of light are imaged to form an object image. There are some rays of light that are not imaged and do not contribute to object image formation. The rays of light that do not contribute to object image formation enter the optical device from disordered directions and impinge on parts other than optical members, such as the lenses, causing unnecessary reflected light or scattered light in the housing. These rays of light are called stray light. Stray light reaches an image capturing element, causing flare or ghost.

Various techniques have been developed to reduce stray light that is generated inside an optical device (component) in order to prevent occurrence of flare or ghost. For example, PTL1 discloses that an inner wall surface of an optical component is covered with a coating of black resin containing fine particles having polygonal and elliptical shapes in cross-section and the fine particles protrude from the surface of the black coating. PTL2 discloses that an inner wall surface of an optical component is covered with a coating of black resin containing spherical fine particles and the fine particles protrude from the surface of the black coating. For these optical components, a material for the fine particles is selected such that the protruding fine particles have substantially the same refractive index as that of the resin. This is intended to absorb rays of light, thereby reducing a reflectance.

CITATION LIST

Patent Literature

PTL1: Japanese Patent Laid-Open No. 2011-64737
PTL2: Japanese Patent Laid-Open No. 2012-2895

The inner wall surface of the optical component disclosed in PTL1 has a glossiness of 0.3 at an incident angle of 60°. As the incident angle increases, the reflectance reducing effect of this optical component becomes insufficient. The inner wall surface of the optical component disclosed in PTL2 has a glossiness of 0.1 at an incident angle of 85°, resulting in a reduction in reflectance. However, the area of contact between the resin and the fine particles, which have a spherical shape, is small, leading to the likelihood that the fine particles may easily come off inside the optical component (lens barrel).

Therefore, reflectance reduction is incompatible with reducing or eliminating flaking of fine particles in an optical member with an antireflection coating.

SUMMARY OF THE INVENTION

An optical member to solve the above-described problem is an optical member including an antireflection coating on a substrate, the antireflection coating includes a resin layer and a modified cross-section fiber bound to the resin layer, the modified cross-section fiber includes a core and a plurality of protrusions extending from the core, and the protrusions have extremities protruding from a surface of the resin layer.

Further features of the present invention will become apparent from the following description of exemplary embodiments with reference to the attached drawings.

DESCRIPTION OF THE EMBODIMENTS

Suitable embodiments of the present invention will be described below.

<Antireflection Coating Material>

An antireflection coating material used to form an antireflection coating on an optical member according to the present invention contains a modified cross-section fiber including a core and a plurality of protrusions extending from the core, a resin, and an organic solvent.

(Modified Cross-Section Fiber)

Figure 1A:
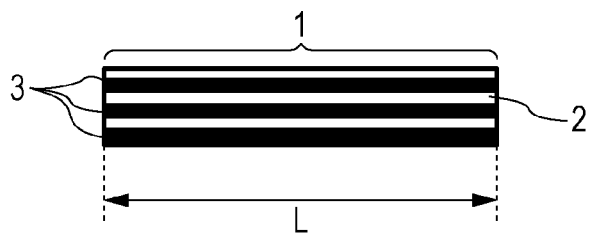
FIG. 1A is a schematic diagram illustrating an embodiment of a modified cross-section fiber to be contained in an antireflection coating material according to the present invention.
Figure 1B:
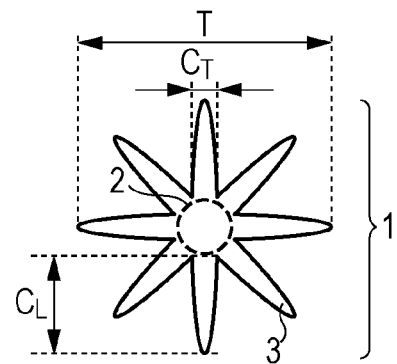
FIG. 1B is a schematic diagram illustrating the embodiment of the modified cross-section fiber to be contained in the antireflection coating material according to the present invention.
Figure 1C:
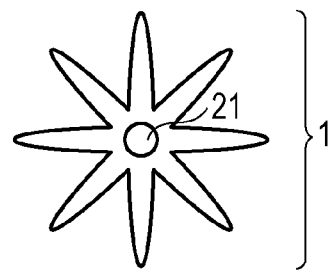
FIG. 1C is a schematic diagram illustrating an embodiment of the modified cross-section fiber to be contained in the antireflection coating material according to the present invention.

FIGS. 1 and 2 are diagrams illustrating embodiments of the modified cross-section fiber to be contained in the antireflection coating material in the present invention. FIG. 1A is a side view of a fiber in its longitudinal direction. FIGS. 1B and 1C are cross-sectional views of the fiber in a direction perpendicular to the longitudinal direction. The term "modified cross-section fiber" as used herein refers to a fiber whose cross-section taken in the direction perpendicular to the longitudinal directional has a shape other than a circle, an ellipse, and a convex polygon in which all interior angles are less than 180°. A modified cross-section fiber 1 includes a core 2 and a plurality of protrusions 3 extending from the core.

The modified cross-section fiber 1 can have a length L of from 0.2 to 1.0 mm. The modified cross-section fiber can be cut to an intended length with a cutter. A length L of less than 0.2 mm of the modified cross-section fiber indicates that the percentage of cut faces having no antireflection capability to the surface area of the modified cross-section fiber may increase, leading to insufficient antireflection effect. A length L of greater than 1.0 mm of the modified cross-section fiber may make it difficult for the protrusions of the modified cross-section fiber to protrude from the surface of the resin when the antireflection coating is formed, and may cause the tip of a spray nozzle to tend to be clogged with the coating material when the coating material is applied with a spray gun.

The modified cross-section fiber 1 can have a thickness T of from 10 to 50 μm. The "thickness T of the modified cross-section fiber" as used herein refers to the length of a cross-section in the direction perpendicular to the longitudinal direction of the modified cross-section fiber, or the length of the cross-section orthogonal to the axis of the fiber. Additionally, the thickness T is a maximum value of the sum of the length of the core 2 and the lengths of the protrusions 3 in the direction across the cross-section. In FIG. 1B, therefore, a length indicated by arrows corresponds to the thickness T of the modified cross-section fiber 1.

The modified cross-section fiber 1 can have an aspect ratio, which is the ratio (L/T) of the length L to the thickness T, of from 4 to 100. The aspect ratio in this range allows the extremities of the protrusions 3 of the modified cross-section fiber to readily protrude from the surface of the resin layer when the antireflection coating is formed. An aspect ratio of less than 4, which indicates a shape close to isotropic, may increase the likelihood that the cut faces of the modified cross-section fiber will protrude from the surface of the resin layer, leading to insufficient antireflection effect. An aspect ratio of greater than 100 may make it difficult to control the orientation of the modified cross-section fiber 1 and thus make it difficult for the extremities of the protrusions 3 to protrude from the surface of the resin layer.

The core 2 is a portion depicted by a dashed line in FIG. 1B and has a circular shape. The core 2 does not necessarily have to be circular and may be polygonal. For the length of the core (the length of a cross-section in the direction perpendicular to the longitudinal direction of the modified cross-section fiber), the length corresponds to the diameter of the core if the core is a circle, the diameter of a circle inscribed in the core if the core is a polygon, and the diameter of the core along a major axis if the core is an ellipse. The core 2 may have a hole 21 as illustrated in FIG. 1C.

Figure 2A:
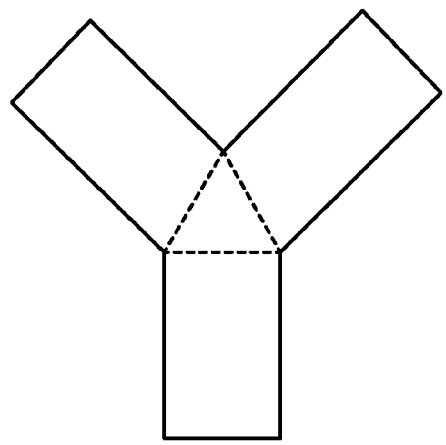
FIG. 2A is a schematic diagram illustrating an embodiment of the modified cross-section fiber to be contained in the antireflection coating material according to the present invention.

The protrusions 3 extend from the core 2 and are made of the same material as that of the core 2. Although FIG. 1B illustrates eight protrusions 3, it is only required that the number of protrusions is two or more because two or more protrusions can scatter light incident between two protrusions to prevent the light from returning to an optical path and reaching an image capturing element. To scatter light more efficiently, the number of protrusions of the modified cross-section fiber can be from three to eight. Therefore, a Y-shaped cross-section providing three protrusions, as illustrated in FIG. 2A, also achieves advantages of the present invention. Examples of commercially available modified cross-section fibers including eight protrusions include Octa (registered trademark) available from Teijin Frontier Co., Ltd. Modified cross-section fibers including nine or more protrusions are difficult to produce.

The protrusions 3 can have a length $C_L$ of from 5 to 20 more preferably from 5 to 12.5 μm. A length $C_L$ of less than 5 μm of the protrusions 3 results in a reduction in the extent to which the protrusions 3 protrude from the surface of the resin layer, so that light may fail to be sufficiently reflected between the protrusions, leading to insufficient reflectance-reducing effect. A length $C_L$ of greater than 20 μm of the protrusions 3 indicates that the protrusions may incline or fall, so that light may fail to sufficiently enter between the protrusions, leading to insufficient reflectance-reducing effect.

The protrusions 3 can have a thickness $C_T$ of from 2 to 6 μm. A thickness $C_T$ of less than 2 μm of the protrusions 3 indicates that the protrusions may incline or fall, so that light may fail to sufficiently enter between the protrusions, leading to insufficient reflectance-reducing effect. A thickness $C_T$ of greater than 6 μm of the protrusions 3 results in a reduction in spacing between the protrusions, so that light may fail to be sufficiently reflected between the protrusions, leading to insufficient reflectance-reducing effect.

Figure 2B:
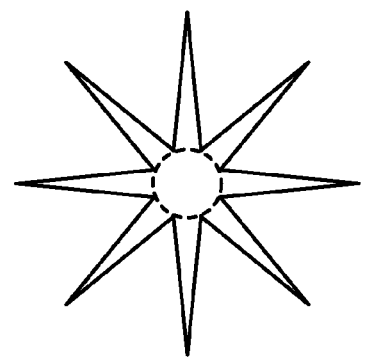
FIG. 2B is a schematic diagram illustrating an embodiment of the modified cross-section fiber to be contained in the antireflection coating material according to the present invention.

For the shape of the protrusions 3, the extremities of the protrusions do not have to be rounded as illustrated in FIG. 1B. Each protrusion may have a pointed extremity as illustrated in FIG. 2B.

Figure 2C:
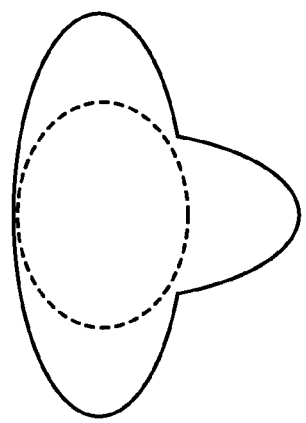
FIG. 2C is a schematic diagram illustrating an embodiment of the modified cross-section fiber to be contained in the antireflection coating material according to the present invention.

Furthermore, the protrusions 3 do not have to be arranged at substantially regular intervals radially about the core 2 as illustrated in FIG. 1B. The protrusions 3 may be arranged at irregular intervals as illustrated in FIG. 2C.

Figure 2D:
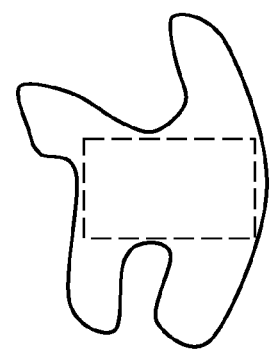
FIG. 2D is a schematic diagram illustrating an embodiment of the modified cross-section fiber to be contained in the antireflection coating material according to the present invention.

Additionally, the protrusions 3 do not have to have a constant size as illustrated in FIG. 1B. The protrusions 3 may have different sizes as illustrated in FIG. 2D.

Figure 2E:
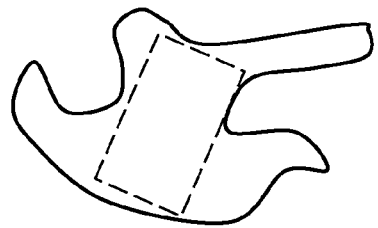
FIG. 2E is a schematic diagram illustrating an embodiment of the modified cross-section fiber to be contained in the antireflection coating material according to the present invention.

Furthermore, the overall cross-section in the direction perpendicular to the longitudinal direction of the modified cross-section fiber 1 does not have to have the same shape. The modified cross-section fiber having a cross-sectional shape illustrated in FIG. 2D may have another cross-sectional shape as illustrated in FIG. 2E. Examples of fibers having such a shape include crimped fibers, which are individually curled. Examples of commercially available crimped fibers include Calculo (registered trademark) available from Teijin Frontier Co., Ltd.

The modified cross-section fiber may be made of any material. The material can be selected from, for example, polyester, nylon, acrylic, polypropylene, rayon, polyethylene, polyurethane, cotton, flax, wool, and combinations thereof. To improve the performance of the antireflection coating, the modified cross-section fiber may be subjected to, for example, processing, light-proof treatment, softening treatment, and anti-fading treatment.

For the content of a modified cross-section fiber in the antireflection coating material according to the present invention, the modified cross-section fiber can be contained in an amount of from 50 to 200 parts by mass relative to 100 parts by mass of coating material solids before addition of the modified cross-section fiber. The term "coating material solids" as used herein refers to all solid components contained in the antireflective coating material that include not only a resin forming a resin layer, which will be described later, but also additives, for example. Less than 50 parts by mass modified cross-section fiber may fail to provide sufficient antireflection effect. More than 200 parts by mass modified cross-section fiber may cause the tip of a spray nozzle to tend to be clogged with the coating material when the coating material is applied with a spray gun. If the antireflection coating were formed, the resin layer would fail to firmly bind the modified cross-section fiber because of a small amount of coating material solids, such as a resin, so that the modified cross-section fiber might be likely to come off.

If the modified cross-section fiber is regarded as part of solids, the modified cross-section fiber can be contained in an amount of from 33 to 67 parts by mass relative to 100 parts by mass of the coating material solids.

(Resin)

A resin contained in the antireflection coating material according to the present invention forms a resin layer after the antireflection coating material is dried. The resin may be of any kind, and can be selected from, for example, acrylic resin, urethane resin, epoxy resin, and combinations thereof. The resin may be either a solvent soluble resin or a reactive curable resin.

The resin in the antireflection coating material according to the present invention can be contained in an amount of from 5 to 50 parts by mass relative to 100 parts by mass of the antireflection coating material. Less than 5 parts by mass resin may deteriorate adhesion with the substrate, whereas more than 50 parts by mass resin may make it difficult to form a thin antireflection coating.

(Organic Solvent)

An organic solvent contained in the antireflection coating material according to the present invention may be of any kind. Examples of the organic solvent include water, thinner, ethanol, isopropyl alcohol, n-butyl alcohol, ethyl acetate, propyl acetate, isobutyl acetate, butyl acetate, methyl ethyl ketone, methyl isobutyl ketone, propylene glycol monomethyl ether, toluene, xylene, acetone, cellosolves, glycol ethers, and ethers. For these solvents, one solvent may be used or multiple solvents may be mixed and used.

The organic solvent in the antireflection coating material according to the present invention can be contained in an amount of from 5 to 80 parts by mass relative to 100 parts by mass of the antireflection coating material. Less than 5 parts by mass organic solvent may make it difficult to form a thin antireflection coating. Such an amount may also cause a discharge opening of a spray gun to be clogged with the coating material when the coating material is applied with the spray gun. More than 80 parts by mass organic solvent may deteriorate adhesion with the substrate. Such an amount may also cause sagging when the coating material is applied with a spray gun.

The antireflection coating material can have a viscosity of from 10 to 200 mPa·s. A viscosity of less than 10 mPa·s of the antireflection coating material may deteriorate adhesion between the substrate and the antireflection coating, whereas a viscosity of greater than 200 mPa·s may make it difficult to form a thin antireflection coating.

(Additive)

The antireflection coating material according to the present invention may further contain an additive. Examples of the additive include dispersing agents, curing agents, curing catalysts, plasticizers, thixotropic agents, levelling agents, infrared-transparent organic coloring agents, infrared-transparent inorganic coloring agents, antiseptics, ultraviolet ray absorbers, antioxidants, and coupling agents. Furthermore, the antireflection coating material may contain a filler for coloring or providing a matte appearance.

(Surface Treatment for Modified Cross-Section Fiber)

To improve dispersibility of the modified cross-section fiber in the antireflection coating material according to the present invention, the surface of the modified cross-section fiber can be subjected to coating treatment. Surface-active agents, inorganic salts, and various resins can be used for coating treatment.

An example will now be described. The surface of the modified cross-section fiber cut to an intended length is treated with, for example, a tannin compound or tartar emetic, thereby forming, for example, a tannin compound on the surface of the fiber. Thus, the water retention properties of, for example, a tannin compound are used to maintain good conductivity of the surface of flock. Alternatively, inorganic salts, an inorganic silicon compound, a surface-active agent, and a mixture thereof are caused to adhere to the surface of the modified cross-section fiber.

Examples of tannin compounds include natural tannins and synthetic tannins. Examples of inorganic salts include sodium chloride (NaCl), barium chloride ($BaCl_2$), magnesium chloride ($MgCl_2$), magnesium sulfate ($MgSO_4$), sodium silicate ($Na_2SiO_3$), sodium carbonate ($Na_2CO_3$), and sodium sulfate ($Na_2SO_4$). Examples of inorganic silicon compounds include colloidal silica. Examples of surface-active agents include anionic surface-active agents, nonionic surface-active agents, ampholytic surface-active agents, and cationic surface-active agents.

(Method of Producing Antireflection Coating)

The antireflection coating material according to the present invention may be produced by any method as long as the modified cross-section fiber can be dispersed in the antireflection coating material. Examples of a device to be used in the producing method include a bead mill, a ball mill, a jet mill, a three-roll mill, a planetary rotator, a mixer, and an ultrasonic homogenizer.

<Optical Member>

Figure 3:
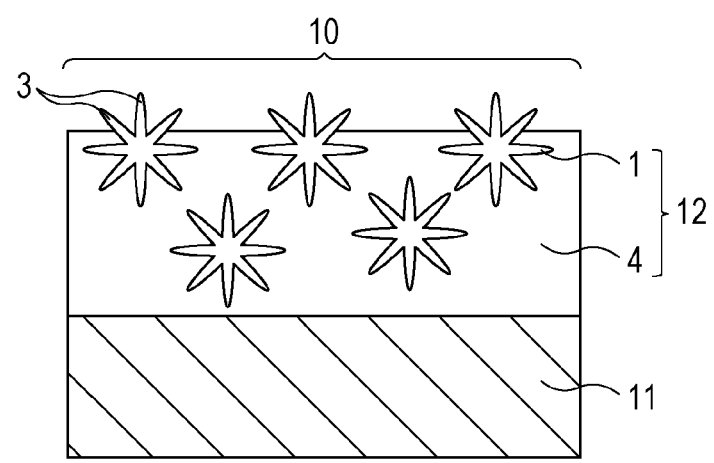
FIG. 3 is a schematic diagram illustrating an embodiment of an optical member according to the present invention.

FIG. 3 is a diagram illustrating an exemplary embodiment of an optical member according to the present invention.

An optical member 10 includes an antireflection coating 12 on a substrate 11. The antireflection coating 12 is formed of the antireflection coating material according to the present invention. The antireflection coating 12 includes a resin layer 4 and a modified cross-section fiber 1 bound to the resin layer 4. The modified cross-section fiber 1, which has been described with reference to FIGS. 1 and 2, includes a core and a plurality of protrusions extending from the core.

The antireflection coating 12 can scatter light incident between two adjacent protrusions because the extremities of the protrusions of the modified cross-section fiber 1 protrude from the surface of the resin layer 4. As illustrated in FIG. 3, the modified cross-section fiber 1 is bound to the resin layer 4 with the protrusions. Therefore, the area of contact between the modified cross-section fiber 1 and the resin layer 4 is greater than that between a spherical particle and the resin layer. The modified cross-section fiber 1 is less likely to come off from the resin layer 4.

The substrate 11 may be made of any material. Examples of metal materials include aluminum, titanium, stainless steel, and magnesium alloy. Examples of plastic materials include polycarbonate resin, acrylic resin, ABS resin, and fluorocarbon resin.

The modified cross-section fiber in the antireflection coating 12 can be contained in an amount of from 33 to 67 parts by mass relative to 100 parts by mass of the antireflection coating. Less than 33 parts by mass modified cross-section fiber may fail to provide sufficient antireflection effect. More than 67 parts by mass modified cross-section fiber, which indicates a small amount of solids, such as a resin, may cause the resin layer to fail to firmly bind the modified cross-section fiber, causing the modified cross-section fiber to be likely to come off.

The antireflection coating 12 can have any thickness, preferably a thickness of from 10 to 500 µm, more preferably from 20 to 200 µm. A thickness of less than 10 µm of the antireflection coating may fail to provide sufficient hiding power. A thickness of greater than 500 µm of the antireflection coating may increase unevenness in thickness of the antireflection coating, causing flaking. To increase the thickness, the coating material can be applied multiple times rather than once.

To improve adhesion between the substrate 11 and the antireflection coating 12, a primer layer can be disposed between the substrate 11 and the antireflection coating 12. The primer layer can be made of any material. Examples of the material include epoxy resin, urethane resin, acrylic resin, silicone resin, and fluorocarbon resin.

The primer layer can have a thickness of from 2 to 30 µm, more preferably from 5 to 20 µm. A thickness of less than 2 µm may provide insufficient adhesion, whereas a thickness of greater than 30 µm may adversely affect the accuracy of thickness of the antireflection coating 12.

(Method of Producing Antireflection Coating)

The antireflection coating can be produced by any method, for example, brush coating, spray coating, dip coating, or transfer. In particular, spray coating is suitable in terms of excellent conformity with the shape of a substrate.

The antireflection coating can be hardened by any method. The antireflection coating can be dried at room temperature. Hardening the antireflection coating can be accelerated with heat. Ultraviolet rays can be applied to the antireflection coating.

<Optical Device>

Figure 4:
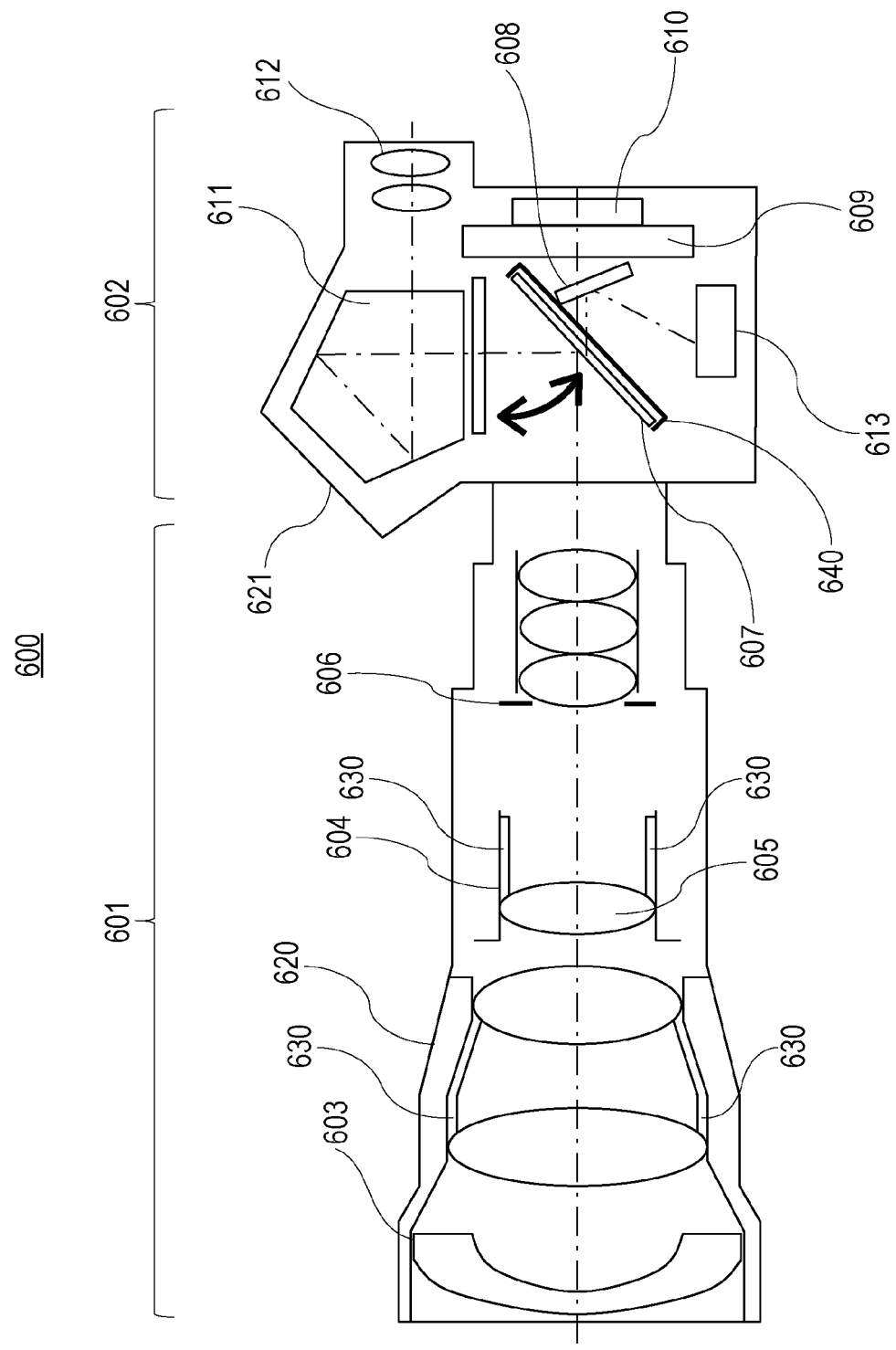
FIG. 4 is a schematic diagram illustrating an embodiment of an image capturing apparatus according to the present invention.

FIG. 4 illustrates an exemplary configuration of a single-lens reflex digital camera as a suitable embodiment of an image capturing apparatus according to the present invention. Referring to FIG. 4, a camera body 602 is coupled to a lens barrel 601, serving as an optical device. The lens barrel 601 is an interchangeable lens, which is attachable to and detachable from the camera body 602.

Light from an object passes through an optical system including lenses 603 and 605 arranged on the optical axis of an image capturing optical system in a housing 620 of the lens barrel 601 and is received by an image capturing element 610. The lens 605 is supported by an inner cylinder 604 such that the lens 605 is movable relative to an outer cylinder of the lens barrel 601 for focusing or zooming.

For an observation period of time before image capture, object light is reflected by a main mirror 607 in a housing 621 of the camera body, passes through a prism 611, and then passes through a finder lens 612, so that a user can view an image to be captured. The main mirror 607 is, for example, a half mirror. Light passing through the main mirror is reflected by a sub-mirror 608 to an auto-focusing (AF) unit 613. This reflected light is used for ranging, for example. The main mirror 607 is attached to a main mirror holder 640 by, for example, adhesion, and supported by the holder. To capture an image, the main mirror 607 and the sub-mirror 608 are moved away from the optical path by a driving mechanism (not illustrated), a shutter 609 is opened, and light entering the lens barrel 601 is formed as an image on the image capturing element 610. A diaphragm 606 is configured such that the area of an aperture is changed to change brightness for image capture or the depth of focus.

An optical member according to the present invention includes a substrate, serving as the housing 620 and the inner cylinder 604, and an antireflection coating 630 disposed on the substrate, and can be used in an image capturing apparatus and an optical device.

The housing 620 can be made of any material. Examples of metal materials include aluminum, titanium, stainless steel, and magnesium alloy. Examples of plastic materials include polycarbonate resin, acrylic resin, ABS resin, and fluorocarbon resin.

An optical device according to the present invention includes an antireflection coating having low reflectance even at a large incident angle in a housing. Such a configuration can sufficiently reduce the probability of occurrence of flare or ghost in an image captured with an image capturing apparatus including the optical device according to the present invention and an image capturing element.

<Method of Evaluation>

(Reflectance Measurement)

Reflectance measurement was performed using optical members each including an antireflection coating on a 150-by-70-millimeter surface of ABS resin.

In each of the above-described optical members, a reflectance at an incident angle of 85° was measured every nanometer in wavelength of from 500 to 600 nm with a ultraviolet-visible-near-infrared spectrophotometer (product name: V-770 available from JASCO Corporation). The measured values were averaged, and the mean value was determined as a reflectance. The measurement was performed after background correction.

(Strength of Antireflection Coating)

For the strength of each antireflection coating, a tape test was performed in conformity with JIS Z 1522. A reflectance of the antireflection coating was measured before and after the tape test. A difference in reflectance before and after the test at or below 0.03% was evaluated as A and a difference in reflectance before and after the test above 0.03% was evaluated as B.

EXAMPLES

Example 1

<Preparation of Antireflection Coating Material>

A modified cross-section fiber A-1 (product name: Octa available from Teijin Frontier Co., Ltd.) having a cross-sectional shape like that in FIG. 1C was prepared. The modified cross-section fiber A-1 is made of polyester and has a thickness T of 25 µm. This fiber includes a core having a diameter of 12.5 µm and eight protrusions. The protrusions have a length $C_L$ of 6.25 µm and a thickness $C_T$ of 3 µm.

Then, the modified cross-section fiber A-1 was cut to a length of 1 mm by using a cutter. In other words, the aspect ratio, which is the ratio of the length to the thickness, of the modified cross-section fiber A-1 is 40. After cutting, the modified cross-section fiber A-1 was dyed with black dye.

The cut modified cross-section fiber A-1, acrylic resin, and thinner, which is an organic solvent, were mixed in a beaker such that the modified cross-section fiber A-1 was contained in an amount of 50 parts by mass relative to 100 parts by mass of coating material solids. To adjust a tint, a flatting agent or a coloring agent, such as carbon black, may be optionally added. A stirrer was used for mixing. The mixture was stirred for 60 minutes at room temperature (23° C.) at a speed of 200 rpm to prepare an antireflection coating material in Example 1.

<Preparation of Optical Member>

Then, the antireflection coating material in Example 1 was applied to a 150-by-70-millimeter surface of ABS resin with a spray gun (product name: W-200 available from ANEST IWATA Corporation).

After that, the ABS resin coated with the antireflection coating material was placed in a constant-temperature drying oven at a temperature of 100° C. and was dried for 120 minutes to form an antireflection coating having a thickness of 70 μm, thus preparing an optical member in Example 1 like that in FIG. 3. Observation of the prepared optical member with a scanning electron microscope revealed that the extremities of the protrusions of the modified cross-section fiber protruded from the surface of the resin layer of the antireflection coating.

(Evaluation of Optical Member>

A determined reflectance of the optical member in Example 1 was 0.12%.

The strength of the optical member in Example 1 was evaluated as A because there was no difference in reflectance before and after the tape test.

Examples 2 to 44

In Examples 2 to 44, the type of modified cross-section fiber, the length thereof, the aspect ratio thereof, the content thereof relative to resin were changed as illustrated in Tables 1 and 2, and antireflection coatings and optical members were prepared in the same manner as that in Example 1. Observation of the prepared optical members with the scanning electron microscope revealed that the extremities of protrusions of the modified cross-section fiber protruded from the surface of the resin layer of the antireflection coating in each of the optical members. Evaluation results of these examples are summarized in Table 3.

The types of the modified cross-section fibers are as follows.

(A-1) Hollow Octa-Lobal Fiber
  cross-sectional shape: FIG. 1C, material: polyester, thickness T: 25 μm, core diameter: 12.5 μm, the number of protrusions: eight, protrusion length $C_L$: 6.25 μm, protrusion thickness $C_T$: 3 μm (A-2) Hollow Octa-Lobal Fiber
  cross-sectional shape: FIG. 1C, material: polyester, thickness T: 50 μm, core diameter: 25 μm, the number of protrusions: eight, protrusion length $C_L$: 12.5 μm, protrusion thickness $C_T$: 6 μm (A-3) Y-Shaped Cross-Section Nylon Fiber
  cross-sectional shape: FIG. 2A, material: rayon, thickness T: 20 μm, core diameter: 3 μm, the number of protrusions: three, protrusion length $C_L$: 9.9 μm, protrusion thickness $C_T$: 2.5 μm (A-4) Crimped Fiber
  cross-sectional shape: FIGS. 2D and 2E, material: polyester, thickness T: 10 μm, core diameter: 5 μm, the number of protrusions: four, protrusion length $C_L$: 2.5 μm, protrusion thickness $C_T$: 2 μm (A-5) Circular Cross-Section Nylon Fiber
  cross-sectional shape: perfect circle, material: nylon, thickness T: 10 μm, the number of protrusions: none

TABLE 1

| | Modified Cross-Section Fiber | | | | | | | | |
|---|---|---|---|---|---|---|---|---|---|
| | | | Whole | | | Core | Protrusion | | | |
| | Type | Material | Length (mm) | Thickness (μm) | Aspect Ratio | Length (μm) | Length (μm) | Thickness (μm) | Mass % | Resin |
| Example 1 | A-1 | polyester | 1 | 25 | 40 | 12.5 | 6.25 | 3 | 50 | acrylic resin |
| Example 2 | A-1 | polyester | 0.5 | 25 | 20 | 12.5 | 6.25 | 3 | 50 | acrylic resin |
| Example 3 | A-1 | polyester | 0.3 | 25 | 12 | 12.5 | 6.25 | 3 | 50 | acrylic resin |
| Example 4 | A-1 | polyester | 0.2 | 25 | 8 | 12.5 | 6.25 | 3 | 50 | acrylic resin |
| Example 5 | A-2 | polyester | 1 | 50 | 20 | 25 | 12.5 | 6 | 50 | acrylic resin |
| Example 6 | A-2 | polyester | 0.5 | 50 | 10 | 25 | 12.5 | 6 | 50 | acrylic resin |
| Example 7 | A-2 | polyester | 0.3 | 50 | 6 | 25 | 12.5 | 6 | 50 | acrylic resin |
| Example 8 | A-2 | polyester | 0.2 | 50 | 4 | 25 | 12.5 | 6 | 50 | acrylic resin |
| Example 9 | A-1 | polyester | 1 | 25 | 40 | 12.5 | 6.25 | 3 | 50 | two-component curable acrylic urethane resin |

TABLE 1-continued

| | | | Modified Cross-Section Fiber | | | | | | |
|---|---|---|---|---|---|---|---|---|---|
| | | | Whole | | | Core | Protrusion | | |
| | Type | Material | Length (mm) | Thickness (μm) | Aspect Ratio | Length (μm) | Length (μm) | Thickness (μm) | Mass % | Resin |
| Example 10 | A-1 | polyester | 0.5 | 25 | 20 | 12.5 | 6.25 | 3 | 50 | two-component curable acrylic urethane resin |
| Example 11 | A-1 | polyester | 0.3 | 25 | 12 | 12.5 | 6.25 | 3 | 50 | two-component curable acrylic urethane resin |
| Example 12 | A-1 | polyester | 0.2 | 25 | 8 | 12.5 | 6.25 | 3 | 50 | two-component curable acrylic urethane resin |
| Example 13 | A-2 | polyester | 1 | 50 | 20 | 25 | 12.5 | 6 | 50 | two-component curable acrylic urethane resin |
| Example 14 | A-2 | polyester | 0.5 | 50 | 10 | 25 | 12.5 | 6 | 50 | two-component curable acrylic urethane resin |
| Example 15 | A-2 | polyester | 0.3 | 50 | 6 | 25 | 12.5 | 6 | 50 | two-component curable acrylic urethane resin |
| Example 16 | A-2 | polyester | 0.2 | 50 | 4 | 25 | 12.5 | 6 | 50 | two-component curable acrylic urethane resin |
| Example 17 | A-1 | polyester | 1 | 25 | 40 | 12.5 | 6.25 | 3 | 43 | two-component curable acrylic urethane resin |
| Example 18 | A-1 | polyester | 0.5 | 25 | 20 | 12.5 | 6.25 | 3 | 43 | two-component curable acrylic urethane resin |
| Example 19 | A-1 | polyester | 0.3 | 25 | 12 | 12.5 | 6.25 | 3 | 43 | two-component curable acrylic urethane resin |
| Example 20 | A-1 | polyester | 0.2 | 25 | 8 | 12.5 | 6.25 | 3 | 43 | two-component curable acrylic urethane resin |
| Example 21 | A-1 | polyester | 1 | 25 | 40 | 12.5 | 6.25 | 3 | 56 | two-component curable acrylic urethane resin |

TABLE 1-continued

|  | Modified Cross-Section Fiber | | | | | | | | |
|---|---|---|---|---|---|---|---|---|---|
|  | | | Whole | | | Core | Protrusion | | |
|  | Type | Material | Length (mm) | Thickness (μm) | Aspect Ratio | Length (μm) | Length (μm) | Thickness (μm) | Mass % | Resin |
| Example 22 | A-1 | polyester | 0.5 | 25 | 20 | 12.5 | 6.25 | 3 | 56 | two-component curable acrylic urethane resin |

TABLE 2

|  | Modified Cross-Section Fiber | | | | | | | | |
|---|---|---|---|---|---|---|---|---|---|
|  | | | Whole | | | Core | Protrusion | | |
|  | Type | Material | Length (mm) | Thickness (μm) | Aspect Ratio | Length (μm) | Length (μm) | Thickness (μm) | Mass % | Resin |
| Example 23 | A-1 | polyester | 0.3 | 25 | 12 | 12.5 | 6.25 | 3 | 56 | two-component curable acrylic urethane resin |
| Example 24 | A-1 | polyester | 0.2 | 25 | 8 | 12.5 | 6.25 | 3 | 56 | two-component curable acrylic urethane resin |
| Example 25 | A-1 | polyester | 1 | 25 | 40 | 12.5 | 6.25 | 3 | 60 | two-component curable acrylic urethane resin |
| Example 26 | A-1 | polyester | 0.5 | 25 | 20 | 12.5 | 6.25 | 3 | 60 | two-component curable acrylic urethane resin |
| Example 27 | A-1 | polyester | 0.3 | 25 | 12 | 12.5 | 6.25 | 3 | 60 | two-component curable acrylic urethane resin |
| Example 28 | A-1 | polyester | 0.2 | 25 | 8 | 12.5 | 6.25 | 3 | 60 | two-component curable acrylic urethane resin |
| Example 29 | A-3 | rayon | 1 | 20 | 50 | 3 | 9.9 | 2.5 | 50 | acrylic resin |
| Example 30 | A-3 | rayon | 0.5 | 20 | 25 | 3 | 9.9 | 2.5 | 50 | acrylic resin |
| Example 31 | A-3 | rayon | 0.3 | 20 | 15 | 3 | 9.9 | 2.5 | 50 | acrylic resin |
| Example 32 | A-3 | rayon | 0.2 | 20 | 10 | 3 | 9.9 | 2.5 | 50 | acrylic resin |
| Example 33 | A-3 | rayon | 1 | 20 | 50 | 3 | 9.9 | 2.5 | 50 | two-component curable acrylic urethane resin |

TABLE 2-continued

| | | | Modified Cross-Section Fiber | | | | | | |
|---|---|---|---|---|---|---|---|---|---|
| | | | Whole | | | Core | Protrusion | | |
| | Type | Material | Length (mm) | Thickness (μm) | Aspect Ratio | Length (μm) | Length (μm) | Thickness (μm) | Mass % | Resin |
| Example 34 | A-3 | rayon | 0.5 | 20 | 25 | 3 | 9.9 | 2.5 | 50 | two-component curable acrylic urethane resin |
| Example 35 | A-3 | rayon | 0.3 | 20 | 15 | 3 | 9.9 | 2.5 | 50 | two-component curable acrylic urethane resin |
| Example 36 | A-3 | rayon | 0.2 | 20 | 10 | 3 | 9.9 | 2.5 | 50 | two-component curable acrylic urethane resin |
| Example 37 | A-4 | polyester | 1 | 10 | 100 | 5 | 2.5 | 2 | 50 | acrylic resin |
| Example 38 | A-4 | polyester | 0.5 | 10 | 50 | 5 | 2.5 | 2 | 50 | acrylic resin |
| Example 39 | A-4 | polyester | 0.3 | 10 | 30 | 5 | 2.5 | 2 | 50 | acrylic resin |
| Example 40 | A-4 | polyester | 0.2 | 10 | 20 | 5 | 2.5 | 2 | 50 | acrylic resin |
| Example 41 | A-4 | polyester | 1 | 10 | 100 | 5 | 2.5 | 2 | 50 | two-component curable acrylic urethane resin |
| Example 42 | A-4 | polyester | 0.5 | 10 | 50 | 5 | 2.5 | 2 | 50 | two-component curable acrylic urethane resin |
| Example 43 | A-4 | polyester | 0.3 | 10 | 30 | 5 | 2.5 | 2 | 50 | two-component curable acrylic urethane resin |
| Example 44 | A-4 | polyester | 0.2 | 10 | 20 | 5 | 2.5 | 2 | 50 | two-component curable acrylic urethane resin |

TABLE 3

| | Reflectance (%) | Strength |
|---|---|---|
| Example 1 | 0.12 | A |
| Example 2 | 0.11 | A |
| Example 3 | 0.11 | A |
| Example 4 | 0.10 | A |
| Example 5 | 0.12 | A |
| Example 6 | 0.11 | A |
| Example 7 | 0.11 | A |
| Example 8 | 0.10 | A |
| Example 9 | 0.12 | A |
| Example 10 | 0.11 | A |
| Example 11 | 0.11 | A |
| Example 12 | 0.10 | A |
| Example 13 | 0.12 | A |
| Example 14 | 0.11 | A |
| Example 15 | 0.11 | A |
| Example 16 | 0.10 | A |
| Example 17 | 0.18 | A |
| Example 18 | 0.17 | A |
| Example 19 | 0.16 | A |
| Example 20 | 0.15 | A |
| Example 21 | 0.15 | A |
| Example 22 | 0.14 | A |
| Example 23 | 0.14 | A |
| Example 24 | 0.13 | A |
| Example 25 | 0.15 | A |
| Example 26 | 0.14 | A |
| Example 27 | 0.14 | A |
| Example 28 | 0.13 | A |
| Example 29 | 0.15 | A |
| Example 30 | 0.14 | A |

TABLE 3-continued

|  | Reflectance (%) | Strength |
|---|---|---|
| Example 31 | 0.14 | A |
| Example 32 | 0.13 | A |
| Example 33 | 0.12 | A |
| Example 34 | 0.11 | A |
| Example 35 | 0.11 | A |
| Example 36 | 0.10 | A |
| Example 37 | 0.16 | A |
| Example 38 | 0.15 | A |
| Example 39 | 0.15 | A |
| Example 40 | 0.14 | A |
| Example 41 | 0.16 | A |
| Example 42 | 0.15 | A |
| Example 43 | 0.15 | A |
| Example 44 | 0.14 | A |

Comparative Example 1

<Preparation of Antireflection Coating Material>

A circular cross-section fiber A-5 having a perfectly circular cross-sectional shape was prepared. The circular cross-section fiber A-5 is made of nylon and has a thickness T of 10 μm. In other words, the diameter of the cross-section is 10 μm.

Then, the circular cross-section fiber A-5 was dyed with black dye. After that, the fiber was cut to a length of 1 mm by using a cutter. In other words, the aspect ratio, which is the ratio of the length to the thickness, of the circular cross-section fiber A-5 is 100.

The cut circular cross-section fiber A-5, acrylic resin, and thinner, which is an organic solvent, were mixed in a beaker such that the circular cross-section fiber A-5 was contained in an amount of 50 parts by mass relative to 100 parts by mass of coating material solids. To adjust a tint, a flatting agent or a coloring agent, such as carbon black, may be optionally added. A stirrer was used for mixing. The mixture was stirred for 60 minutes at room temperature (23° C.) at a speed of 200 rpm to prepare an antireflection coating material in Comparative Example 1.

<Preparation of Optical Member>

Then, the antireflection coating material in Comparative Example 1 was applied to a 150-by-70-millimeter surface of ABS resin with a spray gun (product name: W-200 available from ANEST IWATA Corporation).

After that, the ABS resin coated with the antireflection coating material was placed in a constant-temperature drying oven at a temperature of 100° C. and was dried for 120 minutes to form an antireflection coating having a thickness of 70 μm, thus preparing an optical member in Comparative Example 1 like that in FIG. 3.

(Evaluation of Optical Member)

A determined reflectance of the optical member in Comparative Example 1 was 0.35%.

The strength of the optical member in Comparative Example 1 was evaluated as A because there was no difference in reflectance before and after the tape test.

Comparative Examples 2 to 12

In Comparative Examples 2 to 12, the type of modified cross-section fiber, the length thereof, the aspect ratio thereof, and the content thereof relative to resin were changed as illustrated in Table 4, and antireflection coatings and optical members were prepared in the same manner as that in Comparative Example 1. Evaluation results of these comparative examples are summarized in Table 5.

TABLE 4

|  | Modified Cross-Section Fiber | | | | | | |
|---|---|---|---|---|---|---|---|
|  | Whole | | | | | | |
|  | Type | Material | Length (mm) | Thickness (μm) | Aspect Ratio | Mass % | Resin |
| Comparative Example 1 | A-5 | nylon | 1 | 10 | 100 | 50 | acrylic resin |
| Comparative Example 2 | A-5 | nylon | 0.5 | 10 | 50 | 50 | acrylic resin |
| Comparative Example 3 | A-5 | nylon | 0.3 | 10 | 30 | 50 | acrylic resin |
| Comparative Example 4 | A-5 | nylon | 0.2 | 10 | 20 | 50 | acrylic resin |
| Comparative Example 5 | A-5 | nylon | 1 | 10 | 100 | 50 | two-component curable acrylic urethane resin |
| Comparative Example 6 | A-5 | nylon | 0.5 | 10 | 50 | 50 | two-component curable acrylic urethane resin |
| Comparative Example 7 | A-5 | nylon | 0.3 | 10 | 30 | 50 | two-component curable acrylic urethane resin |
| Comparative Example 8 | A-5 | nylon | 0.2 | 10 | 20 | 50 | two-component curable acrylic urethane resin |
| Comparative Example 9 | A-5 | nylon | 1 | 10 | 100 | 56 | two-component curable acrylic urethane resin |
| Comparative Example 10 | A-5 | nylon | 0.5 | 10 | 50 | 56 | two-component curable acrylic urethane resin |
| Comparative Example 11 | A-5 | nylon | 0.3 | 10 | 30 | 56 | two-component curable acrylic urethane resin |

TABLE 4-continued

| | | | Modified Cross-Section Fiber | | | | |
|---|---|---|---|---|---|---|---|
| | | | Whole | | | | |
| | Type | Material | Length (mm) | Thickness (μm) | Aspect Ratio | Mass % | Resin |
| Comparative Example 12 | A-5 | nylon | 0.2 | 10 | 20 | 69 | two-component curable acrylic urethane resin |

TABLE 5

| | Reflectance (%) | Strength |
|---|---|---|
| Comparative Example 1 | 0.35 | A |
| Comparative Example 2 | 0.33 | A |
| Comparative Example 3 | 0.32 | A |
| Comparative Example 4 | 0.30 | A |
| Comparative Example 5 | 0.35 | A |
| Comparative Example 6 | 0.33 | A |
| Comparative Example 7 | 0.32 | A |
| Comparative Example 8 | 0.30 | A |
| Comparative Example 9 | 0.35 | A |
| Comparative Example 10 | 0.33 | A |
| Comparative Example 11 | 0.32 | A |
| Comparative Example 12 | 0.22 | B |

According to the results of Examples and Comparative Examples, the reflectances in Examples 1 to 44 using the modified cross-section fibers are less than 0.20%, which are good, whereas the reflectances in Comparative Examples 1 to 12 using the circular cross-section fiber are greater than 0.2%.

The reflectance in Comparative Example 12 is lower than the reflectances in Comparative Examples 1 to 11. However, flaking of the spherical particles was visible by eyes after the tape test. The difference in reflectance before and after the tape test was 0.04%, which is a large change. This seemingly resulted from the fact that the content of the spherical particles was 69 parts by mass, which is a large amount.

Since the antireflection coating includes the modified cross-section fiber including the core and the protrusions extending from the core and the extremities of the protrusions protrude from the surface of the resin layer, the optical member according to the present invention can cause light incident between the protrusions to be scattered between the protrusions and thus prevent the light from reaching an image capturing element. Furthermore, the binding force between the modified cross-section fiber and resin is sufficient. Therefore, the optical member that exhibits a low reflectance of less than 0.2% at an incident angle of 85° and in which the modified cross-section fiber is unlikely to come off can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A member comprising a film on a substrate,
   wherein the film comprises a resin layer and a modified cross-section fiber, the modified cross-section fiber including a core and a plurality of protrusions extending from the core, and
   wherein the modified cross-section fiber is contained in an amount of from 33 to 67 parts by mass relative to 100 parts by mass of the film.

2. The member according to claim 1, wherein the modified cross-section fiber has a length of from 0.2 to 1.0 mm.

3. The member according to claim 1, wherein at least one protrusion of the plurality of protrusions has a length of from 2.5 to 20 μm.

4. The member according to claim 1, wherein a length of a cross-section in a direction perpendicular to a longitudinal direction of the modified cross-section fiber has a thickness of from 10 to 50 μm.

5. The member according to claim 4, wherein the modified cross-section fiber has an aspect ratio of from 4 to 100, the aspect ratio being a ratio of the length to the thickness.

6. The member according to claim 1, wherein a number of protrusions of the plurality of protrusions is from three to eight.

7. The member according to claim 1, wherein at least one protrusion of the plurality of protrusions have extremities protruding from a surface of the resin layer.

8. The member according to claim 1, wherein the resin layer has a thickness of from 10 to 500 μm.

9. The member according to claim 1, wherein the modified cross-section fiber is bound on the resin layer.

10. The member according to claim 1, wherein at least one protrusion of the plurality of protrusions has a thickness of from 2 to 6 μm.

11. The member according to claim 1, wherein the film is an antireflection film.

12. An optical device comprising a housing, an optical system including a plurality of lenses, and the member according to claim 11, in the housing,
   wherein the substrate is a support supporting at least one of the lenses and/or an inner wall surface of the housing.

13. A coating material comprising: a modified cross-section fiber including a core and a plurality of protrusions extending from the core; a resin; and an organic solvent,
   wherein the modified cross-section fiber is contained in an amount of from 33 to 67 parts by mass relative to 100 parts by mass of coating material solids.

14. The coating material according to claim 13, wherein at least one protrusion of the plurality of protrusions has a thickness of from 2 to 6 μm.

15. The coating material according to claim 13, wherein the modified cross-section fiber has a length of from 0.2 to 1.0 mm.

16. The coating material according to claim 13, wherein at least one protrusion of the plurality of protrusions has a length of from 2.5 to 20 μm.

17. The coating material according to claim 13, wherein a length of a cross-section in a direction perpendicular to a longitudinal direction of the modified cross-section fiber has a thickness of from 10 to 50 µm.

18. The coating material according to claim 13, wherein the modified cross-section fiber has an aspect ratio of from 4 to 100, the aspect ratio being a ratio of the length to the thickness.

19. The coating material according to claim 13, wherein a number of protrusions of the plurality of protrusions is from three to eight.

20. The coating material according to claim 13, wherein the coating material is an antireflection coating material.

* * * * *